United States Patent [19]
Wilson

[11] 3,897,235
[45] July 29, 1975

[54] GLASS BATCH WETTING SYSTEM

[75] Inventor: Bob G. Wilson, Saugus, Calif.

[73] Assignee: Dart Industries Inc., Los Angeles, Calif.

[22] Filed: May 2, 1974

[21] Appl. No.: 466,334

[52] U.S. Cl. .................. 65/335; 65/27; 65/160; 65/161
[51] Int. Cl.² ................................. C03B 3/00
[58] Field of Search ............... 65/27, 335, 160, 161

[56] References Cited
UNITED STATES PATENTS
3,765,854 10/1973 Kozlowski..................... 65/335 X
3,780,889 12/1973 Frazier et al................... 65/335 X

*Primary Examiner*—Arthur D. Kellogg
*Attorney, Agent, or Firm*—Kenneth J. Hovet; Leigh B. Taylor; Paul R. Wylie

[57] ABSTRACT

A glass batch wetting system for controlling dust pollution in the atmosphere. Glass batch is uniformly wetted immediately prior to its introduction into a glass melting furnace by a hollow fluid dispensing rotating shaft. The shaft is positioned directly within the flow of batch as it moves from a charge hopper to the furnace opening. The rotation of the shaft and amount of fluid addition are varied with the mass flow rate of glass batch into the furnace.

7 Claims, 4 Drawing Figures

PATENTED JUL 29 1975  3,897,235

GLASS BATCH WETTING SYSTEM

BACKGROUND OF THE INVENTION

1. Field of the Invention

The present invention involves the manufacture of glass and, more particularly, to an improvement in charging particulate materials to a glass melting furnace.

2. Description of the Prior Art

Glass batch commonly is a mixture of finely divided solid components which are thoroughly mixed and delivered to a refractory furnace by a system of hoppers, gravity flow chutes and/or other positive displacement means. Since the glass batch is a finely divided material, adverse dust conditions arise whenever the batch is exposed to the high velocity hot gases of a glass melting furnace. Additionally, the glass batch is extremely abrasive and will erode even the hardest steels in a matter of weeks if it is allowed to frictionally contact moving parts of a conventional positive displacement system such as a screw conveyor, auger, paddle means or the like.

One of numerous attempts at reducing the problem of dusting has been to wet the glass batch at some point prior to its delivery to the glass melting furnace. However, inherent with a wetting system is the tendency of the glass batch to cake and thereby cause difficulty in transporting the material to a furnace. If the batch is wetted in a storage bin or hopper, the material has been known to set-up and make removal from the storage bin almost impossible.

A technique for eliminating the caking or setting-up problem is disclosed in U.S. Pat. No. 3,294,555 wherein water is added to the glass batch and mixed while being cooled. Both the glass batch and the water addition are cooled to a temperature preferably below 50°F. Of course, this requires temperture control equipment, heat transfer equipment and relatively expensive intermediate mixing apparatus.

Another attempt to overcome the problem of glass batch caking is that disclosed in U.S. Pat. No. 3,725,022. This patent discloses a mixing and conveying unit comprising paddle blades and screw conveyors for vigorously mixing liquid and dry components prior to the injection of such into a glass melting furnace. Of serious disadvantage to this teaching is the aforementioned abrasion of the pulverulent glass mixture against the exposed steel surfaces. Additionally, such positive displacement installations require a very high capital investment.

A similar screw conveying system is disclosed in U.S. Pat. No. 3,765,854. A primary objective of the screw conveyor disclosed in this patent is to maintain a constant moisture level in the glass batch. As mentioned, in practical terms such an apparatus is not economically feasible due to the abrasiveness of glass batch, cullet and other raw materials common in glass making.

SUMMARY OF THE INVENTION

The present invention provides a hollow rotating shaft having a series of fluid outlets discretely placed along its length and about its circumference. The shaft rotates and fluid is emitted in conjunction with the flow of glass-making raw materials. The shaft is positioned directly within the flow of such materials to affect a uniform dispersion of a wetting fluid throughout the batch. The shaft is located directly adjacent the entrance of a glass melting furnace such that the batch will be charged to the furnace before it can cake or begin hardening. The flow rate of liquid is controlled in accordance with the mass flow rate of the raw materials such that a constant moisture level is maintained in the glass batch.

DESCRIPTION OF THE PREFERRED EMBODIMENT

Figure 1:
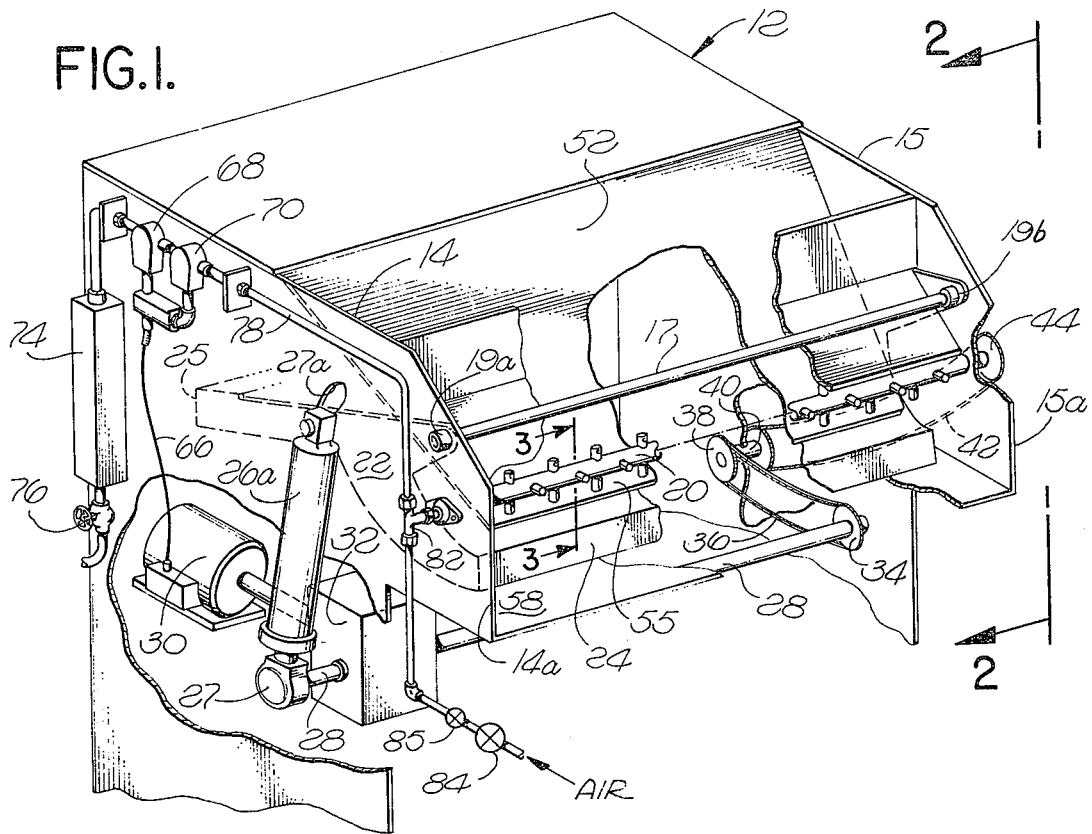
FIG. 1 is a perspective view partially broken away of a preferred embodiment of the wetting system of the present invention.

Referring now to the drawings and, more particularly to FIG. 1, a reciprocating batch charger assembly is shown with the batch wetting device of the present invention. The entire assembly is mounted upon and within a large housing frame which itself may be placed adjacent a glass melting furnace opening. The box-like housing frame is denoted in general by reference numeral 12.

The housing frame includes opposing sidewall members 14 and 15. Extending between the sidewalls are mounted pivot shaft 17 and liquid emitter shaft 20. Shaft 20 is located proximate the midpoint of the lower end opening of chute 54 and above lower edge 57 of the bottom of the chute.

Figure 2:
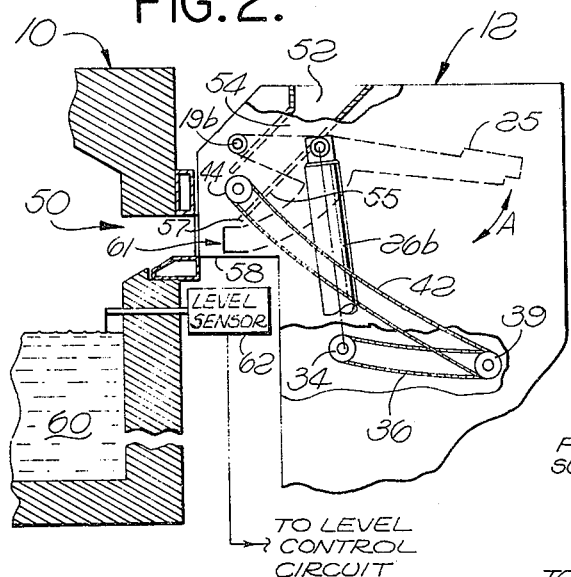
FIG. 2 is a side elevation view taken along lines 2—2 of FIG. 1.

A counterbalanced pusher device 22 is rotatably connected to opposite ends of the pivot shaft adjacent said sidewalls. The pusher device is provided with a front face plate 24 which operates to contact the glass batch and move it into opening 50 of glass melting furnace 10. The device also includes a counterweight portion 25 to assist in minimizing the power required in causing the pusher to reciprocate back and forth in the direction indicated by arrow A (shown in FIG. 2).

The pusher device is driven by a pair of eccentric shafts 26a and 26b located on opposite sides of the pusher. One end of the eccentric shafts is journaled to a portion of the pusher device at a point offset from its pivot mounting 19a and 19b on shaft 17 adjacent the housing frame sidewalls. The other end of said shafts engage an eeccentric mechanism 27 at the end of drive shaft 28. (An identical eccentric mechanism for shaft 26b is not shown). The drive shaft 28 extends through gear box 32 and opposing sidewalls 14 and 15 of the housing. Motor 30 powers the gear box 32 which thereby causes the rotation of shaft 28 at a predetermined power gear ratio.

At the end of the drive shaft 28 opposite the gear box 32 is sprocket 34. A chain 36 connects sprocket 34 with auxiliary sprocket 38. By means of sprocket shaft 40, sprocket 38 is fixedly connected to sprocket 39. Chain 42 connects sprocket 39 with emitter shaft sprocket 44. It can be seen that as motor 30 causes the rotation of drive shaft 28 through gear box 32, the rotational force will be transmitted through the interconnected chain and sprocket system to emitter shaft 20. Similarly, it can be seen that the relative ratio of rotation between shaft 28 and shaft 20 can be set by varying the sizes of the sprockets. Of course, it can also be seen that the speed of rotation of shaft 28 is dictated by the gear drive 32 and speed of motor 30.

For every revolution of shaft 28, the eccentric shafts 26a, b move upward in slots 27a, b (slot 27b not shown) thereby causing the counterweight portion 25 of pusher 22 to be lifted and the front plate 24 to be retracted to a rear position. When the plate 24 is in a retracted position, the particulate charge materials flow by gravity and accumulate in the area denoted as 61 in FIG. 2. As shaft 28 further rotates, the counterweight portion 25 causes the pusher to move downward and the pusher plate 24 to move to a forward position and into contact with the batch materials. This back and forth motion operates to push glass batch and cullet into the furnace opening 50. It is to be understood that the stroke of the pusher is relatively short such that the batch material is gently pushed forward into the furnace without a concomitant wear and abrasion of steel and mechanical parts.

In a typical arrangement, the charge materials will be supplied to the charger assembly from a storage hopper. The materials flow by gravity from the storage hopper (not shown) through a guide means comprising a funnel 52, a chute 54, and a sill plate 58. Lower sidewall housing portions 14a and 15a also serve to guide the batch into the furnace opening. Note that the emitter shaft is located directly within the outlet opening of chute 54 at about the midpoint thereof, and above the end 57 of the chute bottom wall 55.

As the glass batch and/or cullet materials accumulate on sill 58 at area 61 in front of the vertical face plate 24, the reciprocation of the pusher operates to move the accumulated raw materials through the furnace entryway 50. The speed of reciprocation of the pusher is dictated by the desired charging rate and level of molten glass 60 within the furnace 10. The glass level is detected by level sensor 62 which transmits a signal to a level-control circuit 64. The level-control circuitry converts the signal from the level sensor to a voltage which in turn is transmitted to the drive motor 30. As a level varies, so will the control circuit vary the voltage to the motor. For example, when the level sensor indicates a reduced glass level in the furnace, the control circuit will increase the voltage to the motor thereby increasing its speed which in turn is transmitted through the drive chain sequence to increase the reciprocation speed of the pusher and the rotational speed of the emitter shaft. Of course, the level sensor not only varies the speed of the motor, but it can also operate to start and stop the motor.

When the motor 30 is energized, this signal is transmitted by suitable electrical wire means 66 to open solenoid valves 68 and 70. Two valves are shown simply to insure that water flow will be stopped when the pusher is deactivated. This is to prevent the flow of fluid by accident to the glass batch and thereby cause it to set-up.

The amount of fluid flow is controlled by flow meter 74 and valve means 76. Valve means 76 can be manually operated in conjunction with the flow meter reading or it can be automatically controlled in accordance with a pre-set flow setting on the meter 74 with automated instrumentation means known in the art. It has also been found desirable to have a pressure control valve upstream from valve 76 to maintain a steady fluid pressure on the system thereby stabilizing the control and amount of fluid emitted.

It is to be understood that the frequency of reciprocation of pusher 22, length of forward stroke, and the surface area of pusher face 24 together with the area of opening 50 determines the amount of batch charge to opening 50 the furnace 10. In normal operation, the opening 50 is completely filled with the charge materials. Therefore, by knowing the surface area of plate 24, one can closely calculate the mass flow rate of the batch charge given a predetermined stroke and furnace opening. As such, the flow meter may be adjusted accordingly. Preferably, the glass batch charge should contain from 1 to 15 percent by weight fluid. A preferred range is 3 to 8 weight percent.

Figure 3:
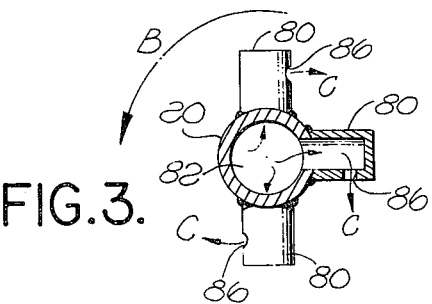
FIG. 3 is a cross-sectional view of the fluid emitting shaft of the present invention taken along lines 3—3 of FIG. 1.

Although the shaft 20 can simply have a series of orifices spaced along its length for emitting fluid, it has been found desirable to locate the orifices in hollow protuberances. These protuberances can take the form of emitters 80 shown in FIG. 3. The emitters are spaced along the entire length of shaft 20 and spaced about the circumference of said shaft in a manner to effect a thorough uniform wetting of the batch as it flows thereby. The shaft is hollow as shown at 82 as are the emitters which have outlet orifices 86. Preferably, the orifices 86 open toward a direction opposite the rotation of the shaft. This is best illustrated in FIG. 3, wherein arrow B shows the rotation of shaft 20 in a counterclockwise direction and arrows C show the flow of fluid out orifices 86 in a clockwise direction.

Although substantially any design may be used for the protuberances, an important feature of the invention resides in the use of relatively large sizes so that they can also function as a disperser or mixing means. Note that as the shaft 20 rotates, the emitters will plow and agitate the batch as it flows thereby.

With the present invention it can be seen that several forces are working to obtain a highly effective dispersion of wetting agent throughout a glass batch. The gravity movement of the particulate charge materials directly over the emitter shaft, the rotation of the shaft as the batch moves by, the mixing action of the emitters as they rotate within the moving batch and the multiple jet-like streams of fluid being forcefully injected into the batch. Additionally, note that with the orifices 86 opening downstream from the movement of the emitters 80, a minor vortex will be created allowing a more free and random emission of fluid.

Referring again to FIG. 3, it is to be noted that the emitters 80 are longitudinally offset from each other but project from only 3 sides, i.e., from about 3 quadrants of the tubular shaft 20. The purpose of this is to allow an open area of about 180° radius during each revolution of the shaft so as to provide an enlarged clearance between the shaft and the bottom edge 57 of chute 54. The advantage of positioning the emitters in this fashion is to allow the passage of relatively large chunks of charge materials which may have been inadvertently introduced into the batch. This occasionally happens when cullet and/or recycled glass has been improperly ground-up and screened.

It is to be noted that a still further advantage of the present invention resides in the fact that there is no overspray of fluid as in prior art wetting systems. This is important when water is used as the wetting fluid since rust and other corrosion will be minimized. Also, more expensive but more efficient wetting agents may be used because of the elimination of overspray and waste. For example, various combustible hydrocarbon fluids such as fuel oils and kerosenes may be used. These fuels penetrate the batch much quicker than water and serve as fuel for the furnace heat. Since the fuels are intimately mixed with the particulate materials, they serve to greatly enhance the conversion of the batch to a molten state. Of course, aqueous solutions of various alkali metal salts may be more efficiently dispersed into the batch by means of the present invention.

As previously mentioned, when motor 30 is actuated, solenoid valves 68 and 70 open, pusher 22 reciprocates and, through chains 36 and 42 and sprockets 34, 38, 40 and 44, the emitter shaft rotates. However, note that the sprocket diameters may be varied in accordance with the desired number of shaft rotations for every stroke of the pusher. A preferred ratio has been found to be 2 shaft rotations for every complete reciprocation of the pusher. This ratio may vary from 30:1 to 1:1.

Figure 4:
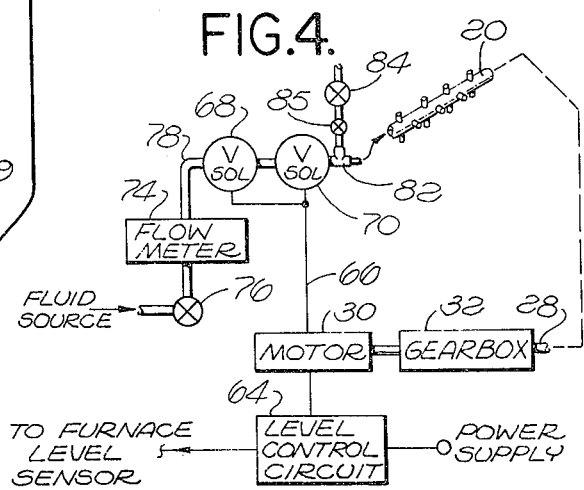
FIG. 4 is a diagrammatic view of the fluid control system used in the preferred embodiment of FIG. 1.

Referring now to FIG. 4, a control system is illustrated together with an optional gaseous purging system. This system allows air, nitrogen or the like to be introduced into the fluid lines 78 at tee 82. A control valve is used to regulate the air flow. There is preferably a check valve 85 where the air enters the fluid lines. This is to prevent the fluid from backing up into the air line.

The advantage of the purging air is that it helps to keep the lines clear and orifices 86 open, especially during the time the wetting system is deactivated. Note that typically, two batch charging assemblies are used per refractory furnace. They operate alternately for periods of 40–70 seconds each so that the wetting system of each charger will be inoperative for a like period. As such, it has been found desirable to maintain a dry gaseous purging stream through the lines during these intermittent off periods.

Tests have shown that with the wetting system of the present invention, dusting within the refractory furnace has been substantially eliminated as are dust emissions from the furnace flu stacks. Likewise there has been a much slower rate of erosion of the furnace regenerators, flu stacks and refractory lining.

What is claimed is:

1. In a system for wetting particulate materials being charged to a glass melting furnace comprising:
   a housing frame;
   guide means within said housing frame for directing particulate materials to an opening in said glass furnace, said guide means including a chute having an outlet opening;
   transport means for moving said particulate materials along at least a portion of said guide means from said chute outlet opening into the furnace opening;
   fluid emitter means comprising a rotatable hollow shaft located within said guide means proximate said chute outlet opening to directly contact said particulate materials, said shaft including a multiplicity of fluid outlet orifices located along the length thereof;
   drive means to power said transport means and cause the rotation of said hollow shaft; and,
   fluid conductor means in communication with a fluid source and said fluid outlet orifices.

2. The system of claim 1 including a fluid control assembly operatively connected to said fluid conductor means and said drive means and including circuit means to activate said drive means in response to the level of molten glass in said furnace.

3. The system of claim 2 wherein said fluid control assembly includes a control valve located in said fluid conductor means, a flow meter means positioned in said conductor means downstream from said control valve, and at least one solenoid valve positioned in said conductor means downstream from said flow meter means, said solenoid valve being adapted to open fluid flow when said circuit means activates said drive means to close fluid flow when said circuit means deactivates said drive means.

4. The system of claim 1 wherein said shaft includes a series of hollow protuberances and said orifices are located on the side of said protuberances facing a direction opposite to the rotation of said shaft.

5. The system of claim 3 wherein said flow control assembly includes means for introducing a gaseous purging medium into said fluid conductor means.

6. The system of claim 1 wherein said transport means includes a counterbalanced rotatable pusher assembly pivotably mounted on said housing frame and having a face plate located proximate said guide means and adapted to engage said particulate matter when said assembly is in a forward position, an eccentric shaft with one end journaled to a portion of said pusher assembly offset from where said assembly is mounted on said housing frame and another end in engagement with a drive shaft eccentric means.

7. The system of claim 4 wherein said protuberances are longitudinally offset from each other and project from about three quadrants of said emitter shaft.

* * * * *